United States Patent
Su et al.

(10) Patent No.: US 6,919,936 B2
(45) Date of Patent: Jul. 19, 2005

(54) ACTIVE MATRIX LIQUID CRYSTAL PANEL AND METHOD FOR REPAIRING DEFECT THEREIN

(75) Inventors: Lee Deuk Su, Tao-Yuan Hsien (TW); Chung Te-Cheng, PingCheng (TW)

(73) Assignee: Hannstar Display Corporation, Hsien (TW)

(*) Notice: Subject to any disclaimer, the term of this patent is extended or adjusted under 35 U.S.C. 154(b) by 54 days.

(21) Appl. No.: 10/625,284

(22) Filed: Jul. 22, 2003

(65) Prior Publication Data

US 2005/0018099 A1 Jan. 27, 2005

(51) Int. Cl.⁷ .................. G02F 1/1333; G02F 1/1337
(52) U.S. Cl. ........................... 349/54; 349/192
(58) Field of Search .................... 349/54, 192

(56) References Cited

U.S. PATENT DOCUMENTS 6,628,368 B2 * 9/2003 Yang ........................ 349/192
6,712,666 B2 * 3/2004 Wu ............................. 445/24
2004/0169781 A1 * 9/2004 Lee et al. .................. 349/54

* cited by examiner

Primary Examiner—Robert H. Kim
Assistant Examiner—Hoan C. Nguyen
(74) Attorney, Agent, or Firm—Seyfarth Shaw LLP

(57) ABSTRACT

An active matrix liquid crystal panel comprises an active matrix substrate, on which a plurality of parallel signal lines and a plurality of parallel scanning lines are arranged for forming a matrix of pixels. The second common electrodes formed in an upper layer where comb-shaped pixels exist have a plurality of apertures. When the signal line has a breakage, a cutting means can cut the two ends of the root trace connected to a closed-loop branch through one of the apertures, and a welding means can weld the broken signal line and the isolated closed-loop branch extended from a first common electrode in a lower layer together through one aperture and another.

6 Claims, 9 Drawing Sheets

ACTIVE MATRIX LIQUID CRYSTAL PANEL AND METHOD FOR REPAIRING DEFECT THEREIN

BACKGROUND OF THE INVENTION

1. Field of the Invention

The present invention relates to an active matrix liquid crystal panel and a method for repairing defects therein, and more particularly to a LCD panel having a repairable configuration.

2. Description of the Related Art

In recent years, flat display panels using liquid crystal and the like as a display medium have become popular as display devices for computers, word processors, and TV sets. In particular, an active matrix liquid crystal panel having switching elements such as thin film transistors for respective pixels to drive the pixels individually is used for a display device which requires a high resolution such as VGA, S-VGA, and XGA and a huge number of pixels for display.

Such an active matrix liquid crystal panel has a pair of substrates sandwiching a liquid crystal layer there between. One of the pair of substrates is provided with switching elements (hereinafter referred to as an active matrix substrate) and includes an insulating substrate, scanning lines and signal lines formed on the insulating substrate to cross each other, switching elements formed in the vicinity of the respective crossings of the scanning lines and the signal lines, and pixel electrodes formed in a matrix and connected to the respective switching elements. The other substrate (hereinafter referred to as a opposing substrate) includes a common electrode.

FIG. 1 is a schematic diagram showing a configuration of one pixel on an active matrix substrate in accordance with a prior art. A liquid crystal panel having a plurality of pixels 10, each with a herringbone shape, is either called a SIPS (Super In-Plane Switching) mode liquid crystal panel or ASIPS (Advanced Super In-Plane Switching) mode liquid crystal panel.

A pair of scanning lines 13 and a pair of herringbone-shaped signal lines 12 enclose the region of the pixel 10. A first common electrode 11d is formed in the layer that the scanning lines 13 exist, and is parallel to the adjoining scanning line 13. Each pair of fork-shaped branches 11d' extending from the first common electrode 1id goes toward one of the scanning lines 13, and is accompanied by the adjoining signal line 12 in such manner that the signal line 12 is across the hollow area of the pair of the fork-shaped branches 11d' without overlapping each other.

On the uppermost surface, a hollow second common electrode 11u almost overlaps the fork-shaped branches 11d', the scanning lines 13, and the signal lines 12, and a zigzag comb-shaped pixel electrode 14 is enclosed by the second common electrode 11u. A switching device 15 formed at the intersection of the signal line 12 and the scanning line 13 is connected to the signal line 12, the scanning line 13 and the pixel electrode 14 by its three terminals. Two branches 11u' extending from the second common electrode 11u go toward the first common electrode 11d. Three branches 141 extending from the pixel electrode 14 like the teeth of a comb go toward the direction in opposition to the branches 11u'. Two branches 11u' and three branches 141 are alternately arranged for a herringbone-shaped structure where horizontal electrical fields exist.

FIG. 2 shows the cross-section along line 1—1 of FIG. 1. All layers are stacked on a transparent substrate 16, such as a glass substrate. When the first common electrode 11d and the scanning lines 13 are formed on the transparent substrate 16, an insulator layer 17 is overlaid thereon. Then, the signal lines 12 formed on the insulator layer 17 is sequentially stacked with a passive layer 18, such as a $SiN_x$ film, and an organic insulator layer 19. On the uppermost surface of the active matrix substrate, there are the second common electrode 11u, the branches 11u' and the branches 141, and all of them are made of ITO (indium-tin-oxide).

The drawback of the structure disclosed in the pixel 10 is the lack of a repairable layout for repairing damaged pixels caused by a broken signal line. Therefore, a liquid crystal panel with a large size or high resolution is more difficult to repair defects related to broken signal lines.

SUMMARY OF THE INVENTION

An objective of the present invention is to provide an active matrix liquid crystal panel having a repairable configuration. When the signal line of a pixel is broken, the branches of a common electrode located at a lower layer can replace the broken segment of signal lines by laser cutting and welding.

In order to achieve the objective, the present invention discloses an active matrix liquid crystal panel and a method for repairing defects therein. The active matrix liquid crystal panel comprises an active matrix substrate, an opposing substrate facing the active matrix substrate, and a liquid crystal layer disposed between the active matrix substrate and the opposing substrate. On the active matrix substrate, a plurality of parallel signal lines and a plurality of parallel scanning lines are arranged for forming a matrix of pixels. Two adjoining signal lines and two adjoining scanning lines define one pixel. At least one switching device formed at the crossing point of the signal line and the scanning line is connected to the signal line and the scanning line by its two terminals with respect to one pixel. Each of the zigzag comb-shaped pixel electrodes in each pixel is connected to the third terminal of the switching device.

Each of first common electrodes is formed in parallel to the adjoining scanning line, and each of two closed-loop branches in each pixel extended from the root traces of the first common electrode goes toward the next or previous scanning line along the signal line. A hollow second common electrode almost overlapping the close-loop branches, the scanning lines, and the signal lines encloses the comb-shaped pixel electrode. Branches of the second common electrode and branches of the pixel electrode in one pixel go toward the directions in opposition to each other, and are alternatively arranged for a herringbone-shaped structure where horizontal electrical fields exist.

The second common electrode has a plurality of apertures. One of the signal lines and the trace of the closed-loop branches are together across one of the apertures underneath, and the root trace and one of the signal lines are together across another one of the apertures underneath.

When the signal line has a breakage in one pixel, cutting means can cut the two ends of the root trace through one of the apertures, and welding means can weld the signal line and the isolated closed-loop branch connected to the cut root trace together through one aperture and another.

BRIEF DESCRIPTION OF THE DRAWINGS

The invention will be described according to the appended drawings in which.

PREFERRED EMBODIMENT OF THE PRESENT INVENTION

Figure 3:
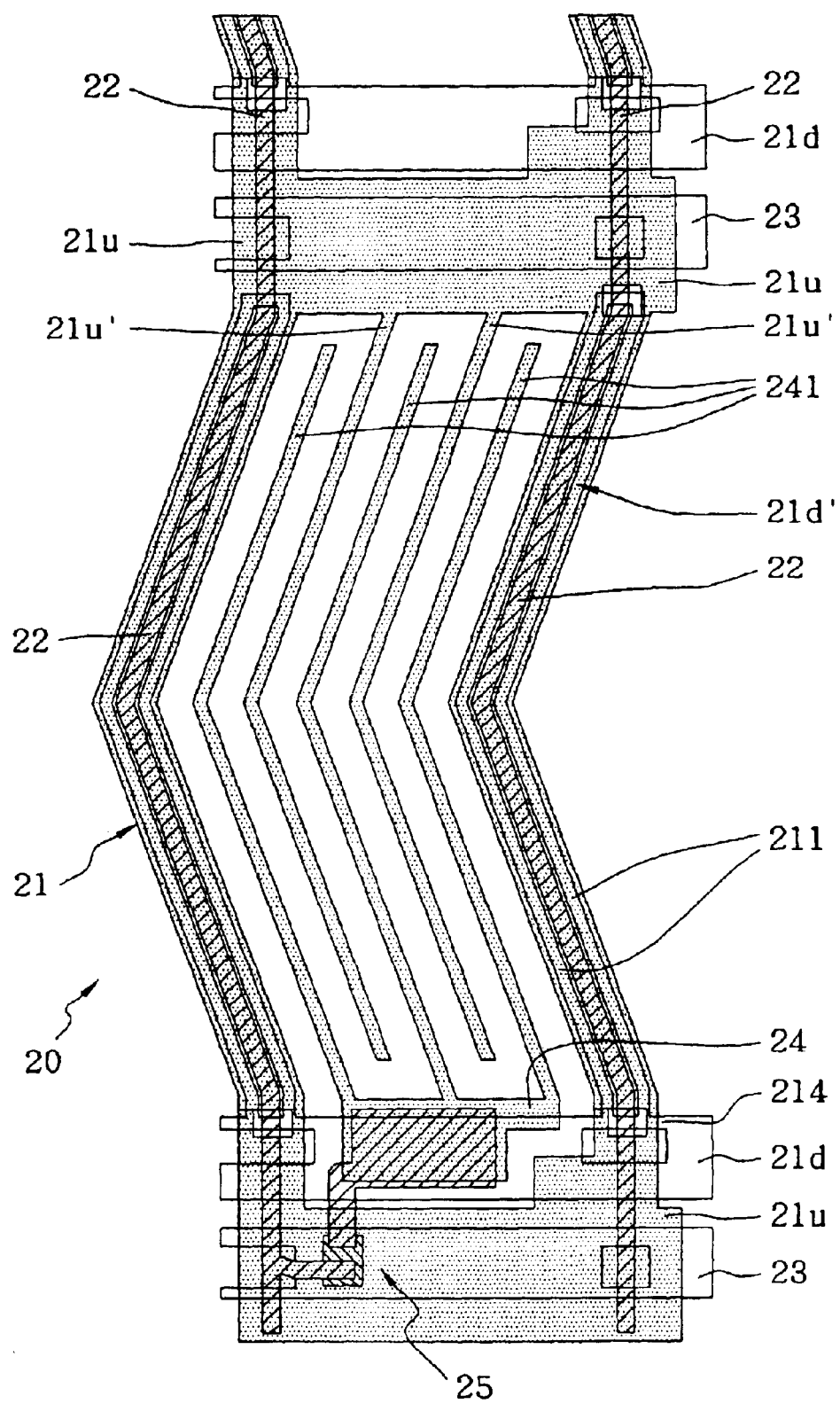
FIG. 3 shows the configuration of one pixel on an active matrix substrate in accordance with the present invention.

FIG. 3 is a schematic diagram showing the configuration of one pixel on an active matrix substrate in accordance with the present invention. The liquid crystal panel having a plurality of pixels 30, each with a herringbone shape, is called a SIPS mode liquid crystal panel. If the upper insulator layer (not shown) is made from organic material, it is called an ASIPS mode liquid crystal panel.

A pair of parallel scanning lines 23 and a pair of herringbone-shaped signal lines 22 enclose the region of the pixel 20. A first common electrode 21d is formed in the layer that the scanning lines 23 exist, and is parallel to the adjoining scanning line 23. Each of the closed-loop branches 21d' extending from the root trace 214 of the first common electrode 21d goes toward one of the scanning lines 23, and is accompanied by the adjoining signal line 22 in such manner that the signal line 22 is across the hollow area of the closed-loop branch 21d' without overlapping a transverse trace 212 (as shown in FIG. 4(a)).

On the uppermost surface, a hollow second common electrode 21u almost overlaps the closed-loop branches 21d', the scanning lines 23 and the signal lines 22, and a zigzag comb-shaped pixel electrode 24 is enclosed by the second common electrode 21u. A switching device 25 formed at the intersection of the signal line 22 and the scanning line 23 is connected to the signal line 22, the scanning line 23 and the pixel electrode 24 by its three terminals. Two branches 21u' extending from the second common electrode 21u go toward the first common electrode 21d. Three branches 241 extending from the pixel electrode 24 like the teeth of a comb go toward the direction in opposition to the branches 21u'. Two branches 21u' and three branches 241 are alternately arranged for a herringbone-shaped structure where horizontal electrical fields exist.

Figure 1:
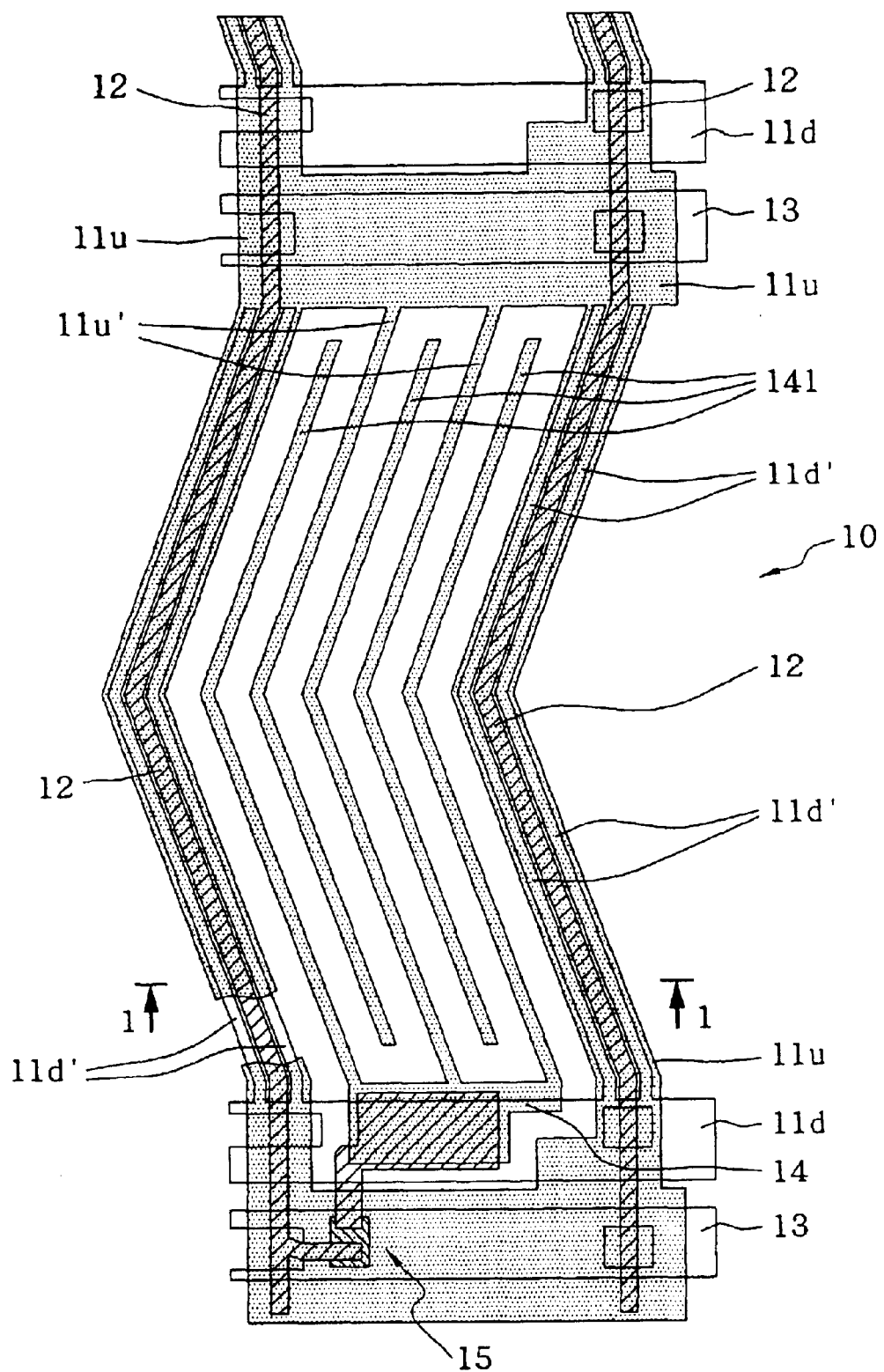
FIG. 1 shows a configuration of one pixel on an active matrix substrate in accordance with a prior art.
Figure 2:
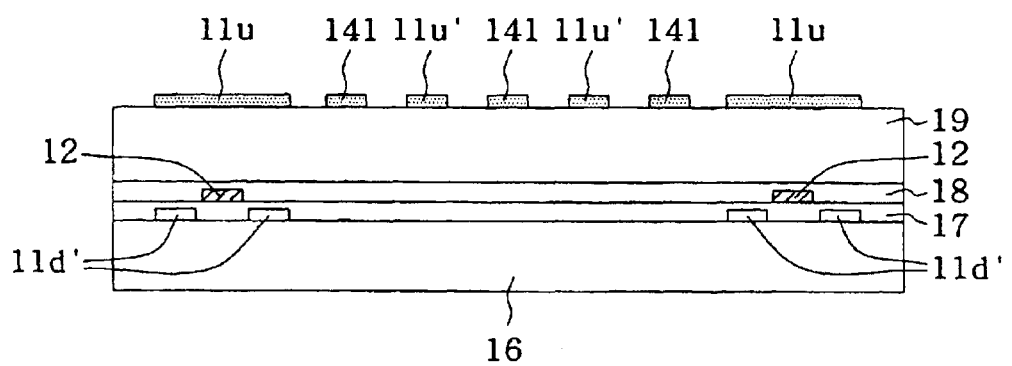
FIG. 2 shows the cross section along line 1—1 of FIG. 1.
Figure 4A:
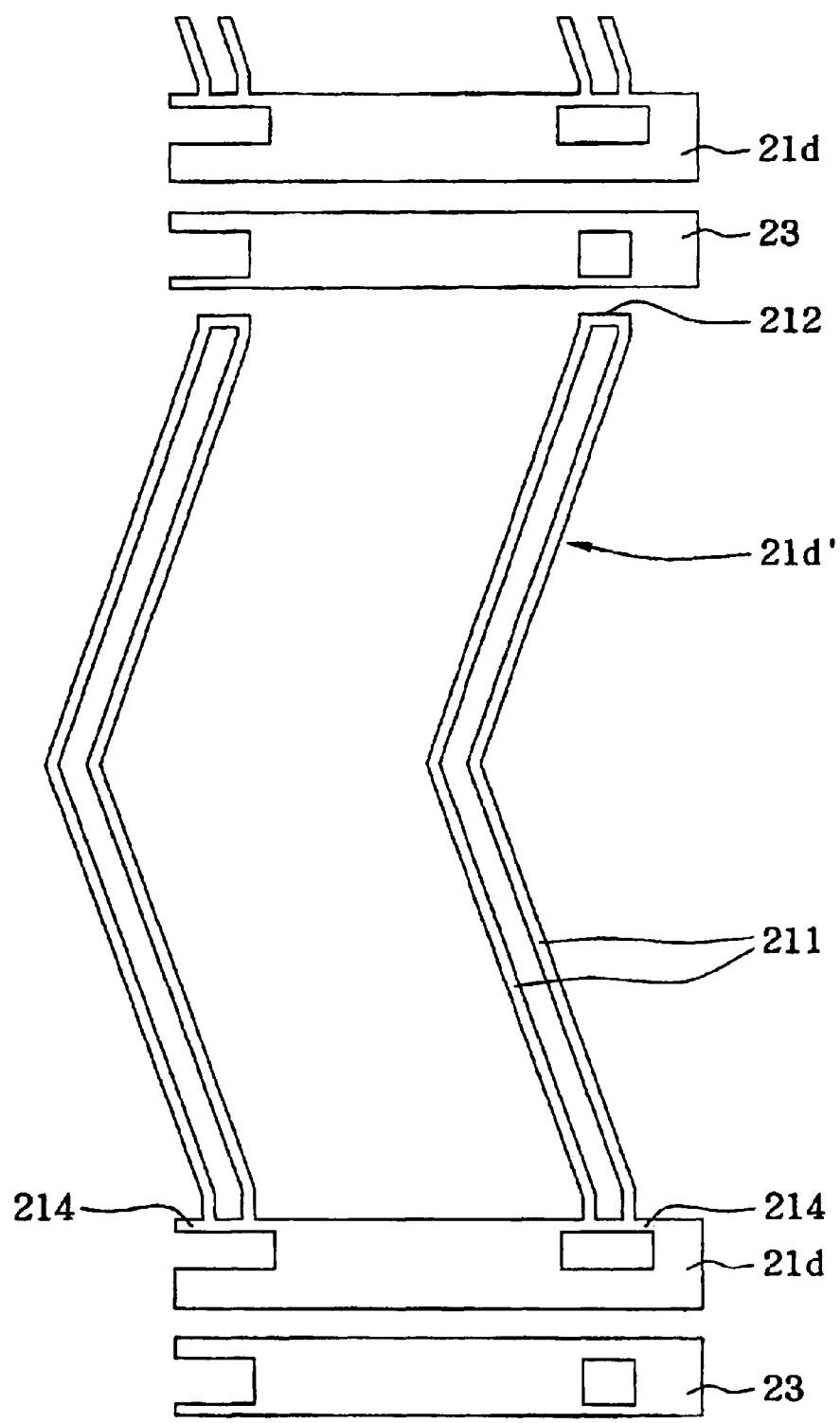
FIG. 4(a) shows the configuration of the layer that the first common electrodes and the scanning lines exist.

FIG. 4(a) alone shows the layer of the first common electrodes 21d and the scanning lines 23 concurrently formed during the metal-one process. In comparison with FIG. 1, the closed-loop branch 21d' is different from the fork-shaped branch 11d' because it has the transverse trace 212 separately connected to the ends of two lengthwise traces 211.

Figure 4B:
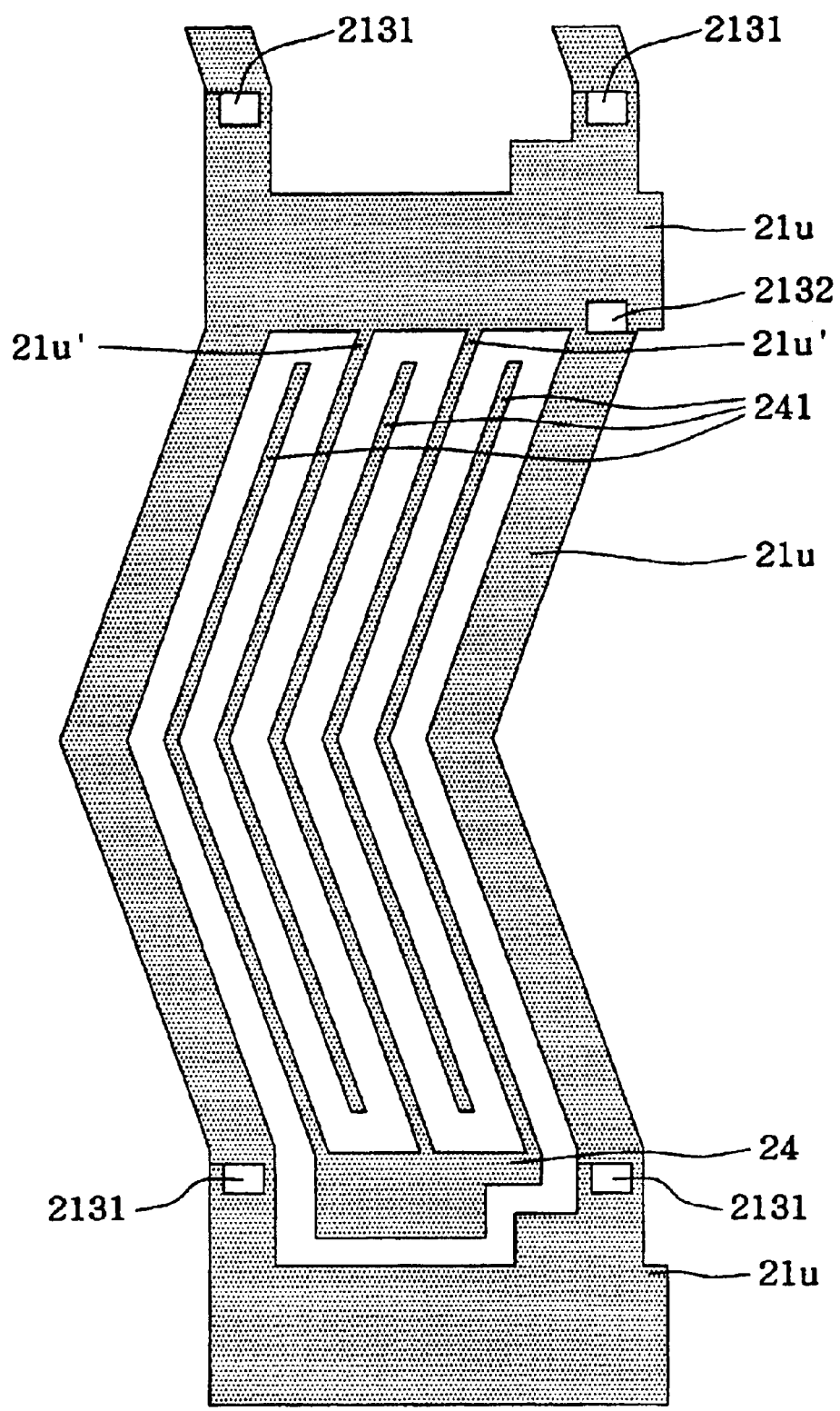
FIG. 4(b) shows the configuration of the layer that the second common electrode and the pixel electrode exist.

FIG. 4(b) alone shows the layer of the second common electrode 21u and the pixel electrode 24 concurrently formed during the ITO process. The second common electrode 21u has a plurality of apertures 2131 and 2132. Repair means can go through the apertures 2131 and 2132 to get the signal lines 22 and the closed-loop 21d.

Figure 5:
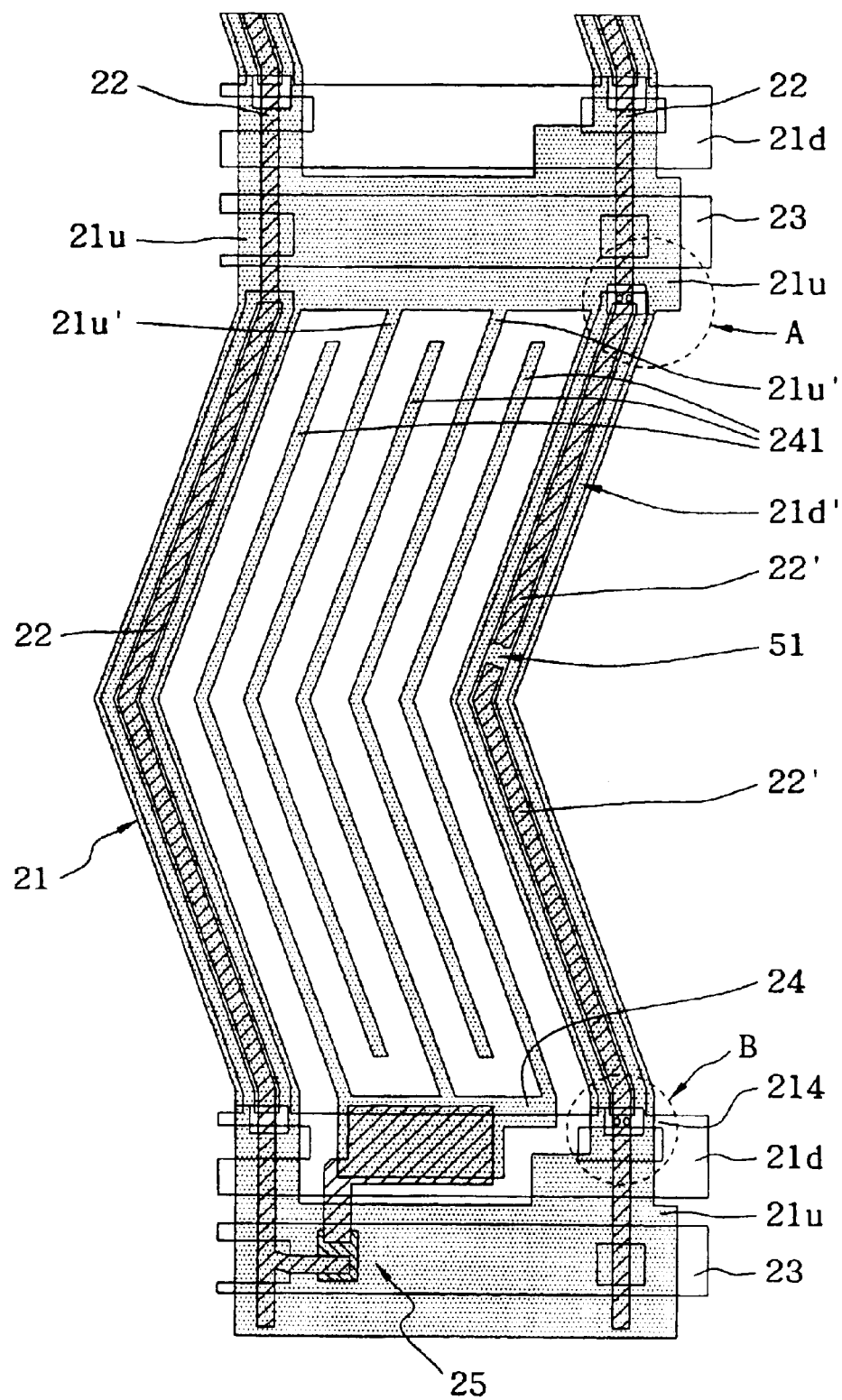
FIG. 5 shows a broken signal line adjacent to the pixel in FIG. 3.
Figure 6:
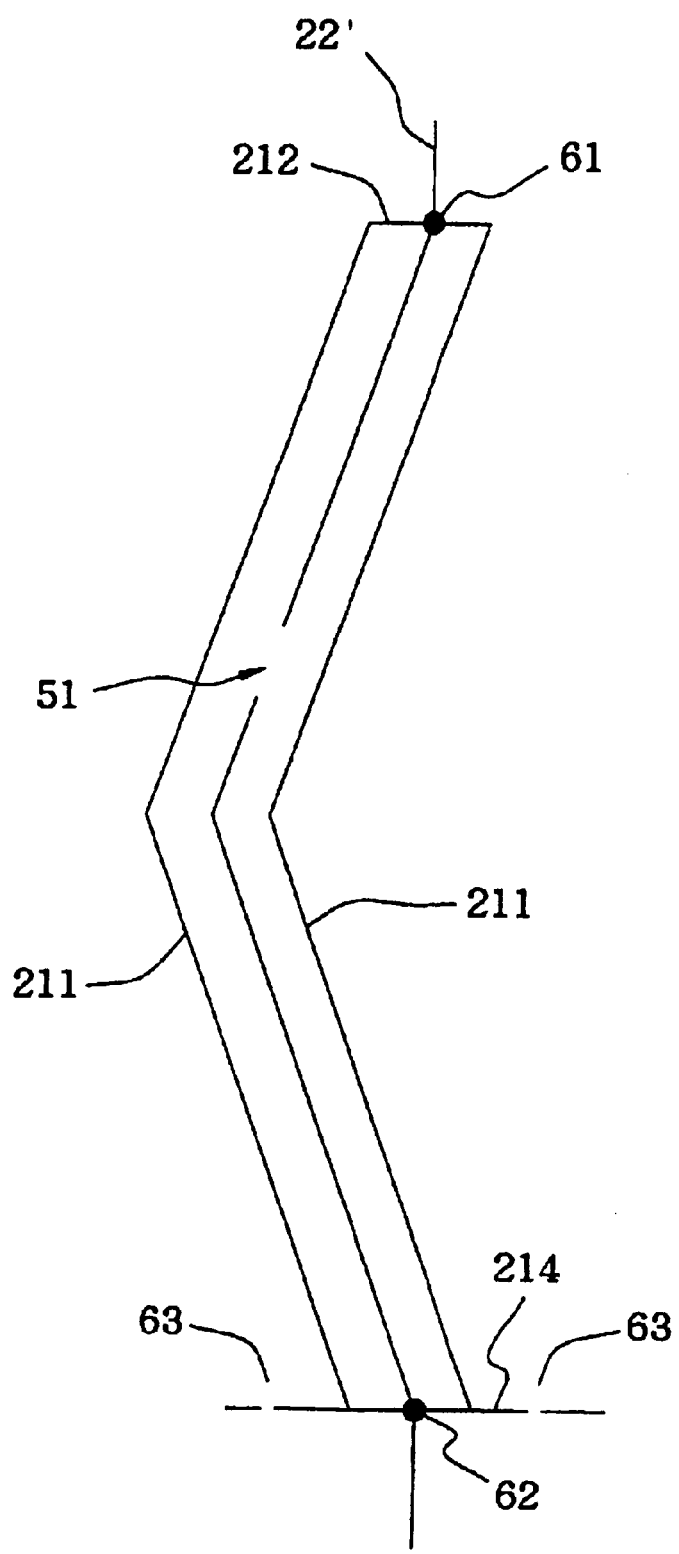
FIG. 6 shows a schematic diagram of a cut closed-loop branch used in place of a broken signal line by welding.

In general, during the fabrication process of the liquid crystal panel, the following problems occur. As shown in FIG. 5, when a breakage 51 occurs in a signal line 22', the pixel electrodes 24 connected to the broken signal line 22' is not supplied with a proper driving signal. As a result, the pixel fails in effecting a normal display, causing a so-called line defect. If we can cut the closed-loop branches 21d' and weld the broken signal line 22' and the isolated closed-loop branches 21d' together, the welded closed-loop branches 21d' can replace the broken segment of the signal line 22' by two cutting points 63 and welding points 61 and 62, as shown in FIG. 6.

Figure 7A:
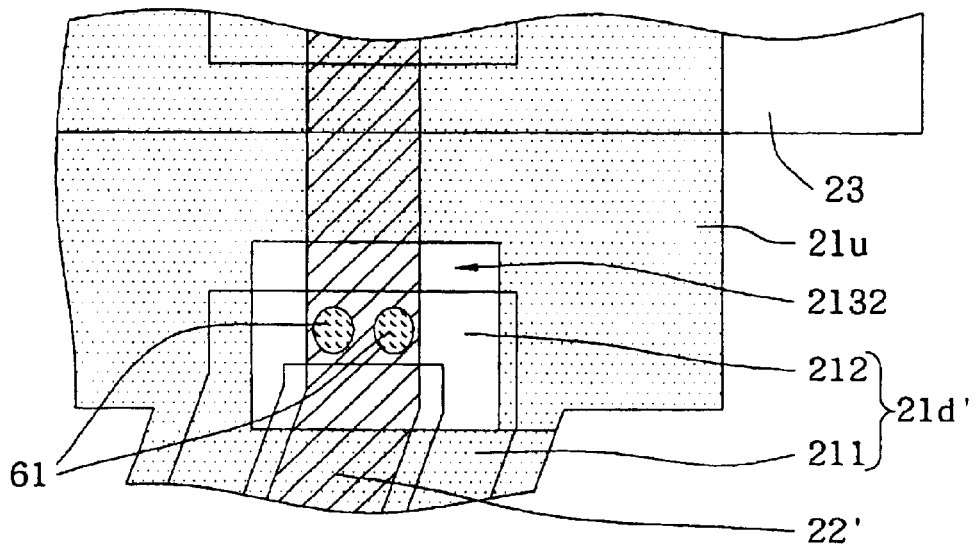
FIG. 7(a) shows an enlarged diagram of portion A in FIG. 5.

FIG. 7(a) shows an enlarged diagram of portion A after the broken signal line 22' is repaired. The signal line 22' and the transverse trace 212 of the closed-loop branch 21d' are together across the aperture 2132 underneath. Therefore, welding means, such as laser repair apparatus, can weld the signal line 22' and the isolated closed-loop branch 21d' connected to the cut root trace 214 (as shown in FIG. 7(b)) together through the aperture 2132 by the vertically welded points 61.

Figure 7B:
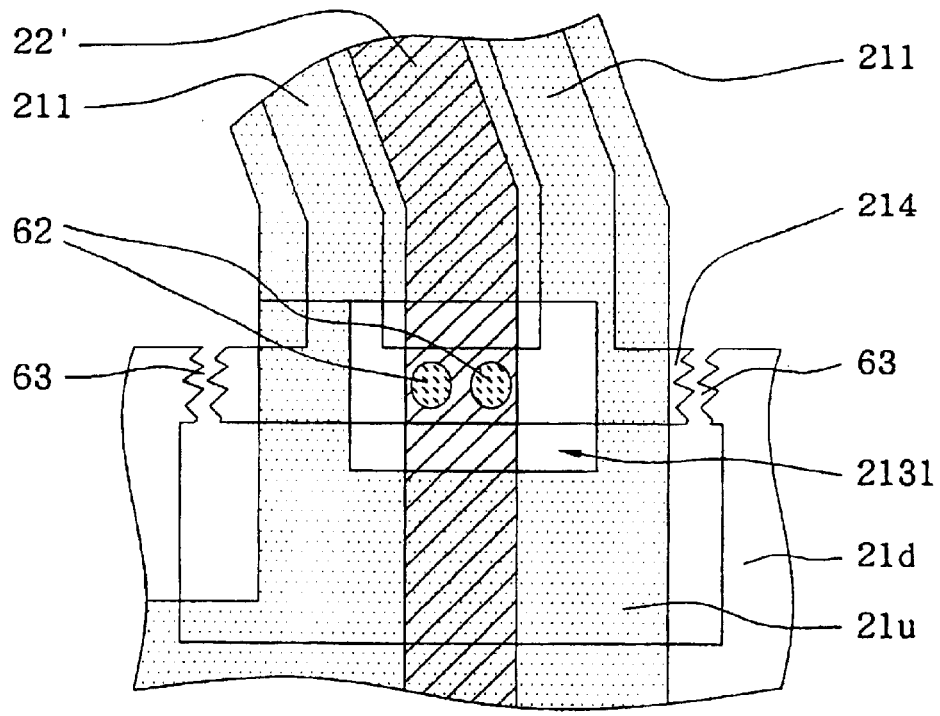
FIG. 7(b) shows an enlarged diagram of portion B in FIG. 5.

FIG. 7(b) shows an enlarged diagram of portion B after the broken signal line 22' is repaired. The signal line 22' and the cut root trace 214 are together across the aperture 2131 underneath. Therefore, welding means can weld the signal line 22' and the cut root trace 214 together through the aperture 2131 by the vertically welded points 62 after a cutting means, such as laser cutting apparatus, cuts the two ends of the root trace 214 through the aperture 2131. The two ends of the root trace 214 are not overlapped with the second common electrode 21u.

Figure 8:
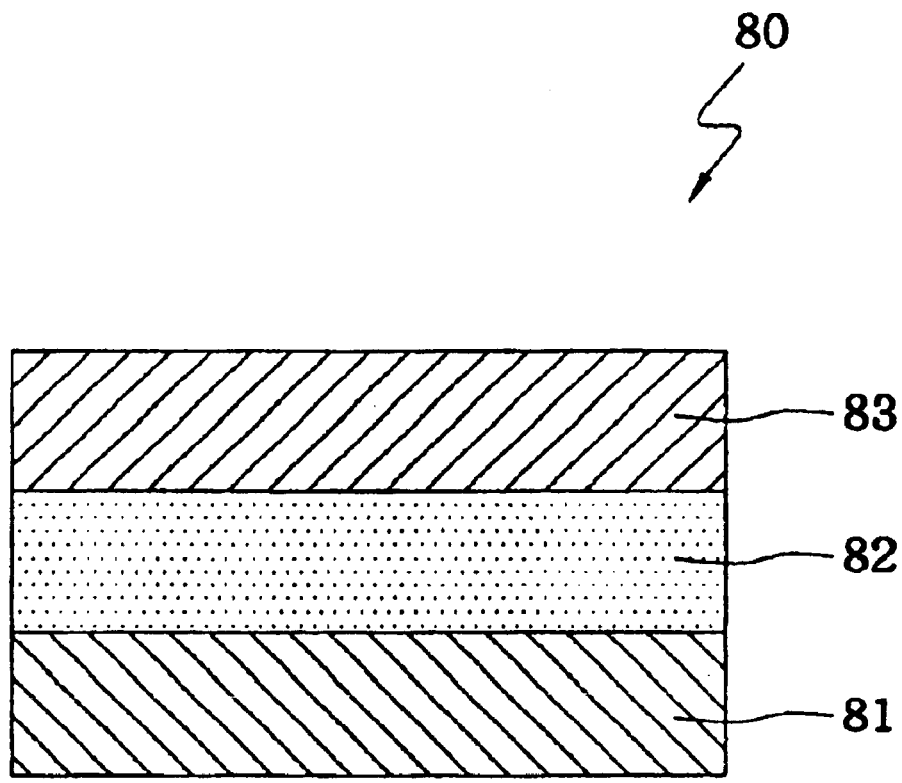
FIG. 8 shows the structure of a liquid crystal panel in accordance with the present invention.

FIG. 8 shows the structure of an active matrix liquid crystal panel in accordance with the present invention. The active matrix liquid crystal panel 80 comprises an active matrix substrate 81 having a repairable configuration as aforementioned, an opposing substrate 83 facing the active matrix substrate, and a liquid crystal layer 82 disposed between the active matrix substrate and the opposing substrate.

The above-described embodiments of the present invention are intended to be illustrative only. Numerous alternative embodiments may be devised by persons skilled in the art without departing from the scope of the following claims.

What is claimed is:

1. An active matrix liquid crystal panel having a repairable configuration, comprising:
   an active matrix substrate including:
      a plurality of signal lines and scanning lines, which are arranged to form a matrix of pixels;
      a plurality of switching devices provided at intersections of the signal lines and the scanning lines;
      a plurality of comb-shaped pixel electrodes connected to the switching devices;
      a plurality of first common electrodes including closed-loop branches and root traces, wherein the closed-loop branches are connected to root traces; and
      a plurality of comb-shaped second common electrode including a plurality of first apertures and second apertures, wherein two ends of the signal lines are electrically connected to their adjoining closed-loop branches and root traces through the first apertures and the second apertures respectively if the signal lines are broken;
   an opposing substrate facing the active matrix substrate; and
   a liquid crystal layer disposed between the active matrix substrate and the opposing substrate.

2. The active matrix liquid crystal panel having a repairable configuration of claim 1, wherein two ends of the root traces space a distance from the second common electrode.

3. The active matrix liquid crystal panel having a repairable configuration of claim 1, wherein the broken signal lines are repaired to electrically connect to their adjoining closed-loop branches and root traces by a laser repair apparatus.

4. The active matrix liquid crystal panel having a repairable configuration of claim 1, wherein the second aperture is adjacent to the scanning line connected to the pixel.

5. The active matrix liquid crystal panel having a repairable configuration of claim 1, wherein the second common electrode and the pixel electrode have a teeth portion in one pixel, and the two teeth portions go toward the opposite directions and are alternately arranged for a herringbone-shaped structure where horizontal electrical fields exist.

6. The active matrix liquid crystal panel having a repairable configuration of claim 1, wherein the second common electrodes and the pixel electrodes are stacked on an organic insulator layer.

* * * * *